Patented Aug. 24, 1943

2,327,752

UNITED STATES PATENT OFFICE 2,327,752

PLASTIC PUTTYLIKE ASPHALT COMPOSITION AND PROCESS OF MAKING SAME

Jacob van den Berge, Amsterdam, Netherlands, assignor to Shell Development Company, San Francisco, Calif., a corporation of Delaware No Drawing. Application February 9, 1940, Serial No. 318,179. In the Netherlands March 20, 1939

5 Claims. (Cl. 106—281)

This invention relates to the production of bituminous materials with plastic properties, consisting of mixtures of asphaltic bitumens with mineral and/or non-mineral fillers or the like substances.

The invention consists in using asphaltic bitumens with a penetration at 25° C. exceeding about 50 and a penetration index of +7 or above.

By "penetration index" is meant a figure indicating the temperature-susceptibility of asphaltic bitumen, which figure is derived from a penetration determination, usually at 25° C., and the softening point ring and ball. This method of testing bitumens is described in the "Kolloid Zeitschrift," 1936, vol. 76, No. 1, pages 95 to 111. Three types of asphaltic bitumens are thus distinguished, viz.:

1. Those with a normal temperature-susceptibility, having a penetration index between —1 and +1; these include most of the bitumens obtained by steam distillation, e. g. Mexican bitumens, as generally applied in road construction (N-type);
2. Those with a high temperature-susceptibility, having a penetration index below —1, also designated as being of the coaltar pitch type (Z-type);
3. Those with a low temperature-susceptibility, having a penetration index exceeding +1, also designated as being of the blown type (R-type).

Bituminous materials containing blown asphaltic bitumens mixed with mineral or non-mineral fillers are already known; such compositions are applied, inter alia, for the protection of steel and concrete structures from corrosion and in general from any aggressive influences.

The asphaltic bitumens of this nature hitherto used are of the well-known "blown" type, the penetration index of which lies below about +6, while the penetration at 25° C. is below about 50. These known asphaltic bitumens of the blown type may readily be liquefied by heating and subsequently mixed with mineral or non-mineral fillers. Unless the mixtures thus obtained are converted into emulsions or are fluxed to a high degree, they can only be applied in the hot state.

Now according to the invention it has been found that by using asphaltic bitumens having a penetration at 25° C. exceeding about 50 and a penetration index of +7 or above and adding fillers one may obtain bituminous materials having very advantageous properties for various applications, which can be applied in the cold state. In fact, the materials obtained are kneadable and have the consistency of putty. In contradistinction to putty, however, they retain their plastic properties and no hardening occurs.

In view of these special properties the bituminous materials according to the invention are eminently suitable for all kinds of sealing purposes, e. g. for the filling or sealing of joints between bricks, concrete and wood, as a substitute for putty, as moulding masses, sleeve-filling compounds, and also for the manufacture of acid-proof coatings on brick, concrete and wood.

Since the asphaltic bitumens to be used according to the invention melt at a relatively very high temperature, which involves the risk of decomposition, the addition of the fillers to the molten asphaltic bitumen may give rise to difficulties. It is, therefore, preferable to add the fillers to the initial materials before the preparation of the asphaltic bitumen, or to admix the fillers during the preparation of the asphaltic bitumen.

For the production of such bitumens one may start from an asphaltic bitumen of the usual type, but with as high a penetration index as possible, such as may be prepared by blowing a suitable initial material as intensively as possible. Such a bitumen, the penetration index of which may range between about +3 and +6, is liquefied by heating and then mixed with a high-boiling oil, or an oil residue of aliphatic character, in such a manner that an asphaltic bitumen with a penetration at 25° C. exceeding about 50 and a penetration index of +7 or above is obtained. Before the bitumen thus obtained is cooled, the comminuted fillers may be added. These fillers may be of various types; both mineral and non-mineral admixtures, are suitable, e. g. cement, marl, barytes, mica, micro-asbestos, asbestos powder, cork powder, vegetable or animal fibres. The aliphatic oil which is added to the asphalt may be any paraffinic oil, preferably one having a high viscosity. Pennsylvania oils are particularly suited for this purpose as are the raffinates produced by subjecting an asphaltic or mixed base oil to solvent extraction with a naphthenic solvent, or preferably those produced by the so-called duo-sol process, i. e. an extraction process wherein a paraffinic solvent and naphthenic solvent are used simultaneously to produce a better separation of the aromatic and paraffinic components of the oil. Petrolatum may also be used to raise the penetration index of the asphalt.

*Example*

A blown asphaltic bitumen with penetration at 25° C.=10, melting point R. & B.=130° C., penetration index +5.8 is mixed at 240° C. with 25% by weight of a Pennsylvania oil with a viscosity Engler at 50° C.=75. The asphaltic bitumen thus obtained has a penetration at 25° C.=75, melting point R. & B. higher than 160° C. and a penetration index above +12. Subsequently 10% by weight Portland cement is added to the mass which is still liquid, whereupon the mixture is allowed to cool. Finally, with a view to increasing the kneadability of the product 2% by weight kerosene may be admixed.

It is known that others have proposed similar sealing compounds in the past. However, the present invention distinguishes over such attempts to prepare a suitable compound in the high penetration index of the bitumen now used, which causes the sealing compound not to set but rather to remain plastic. For instance, U. S. Patent 2,142,584 to Ferguson discloses a sealing compound similar to the present invention except that the asphalt used has a penetration index of only +3, and therefore the desirable result of the present invention was not obtained.

I claim as my invention:

1. A plastic putty-like asphalt composition suitable for use in sealing joints and the like comprising a binder and a finely comminuted filler, said binder having a penetration at 25° C. exceeding 50 and a penetration index of at least +7 and consisting of a mixture of a complete blown asphalt having a penetration index of from +3 to +6 and a viscous paraffinic oil.

2. The product of claim 1 wherein the binder has a penetration of at least 50 at 25° C.

3. The product of claim 1 wherein the filler is cork powder.

4. The process of making an asphaltic plastic putty-like composition suitable for use in sealing joints and the like comprising blending while hot with a melted complete blown asphalt a sufficient quantity of a viscous paraffinic petroleum oil to produce a binder having a penetration at 25° C. exceeding 50 and a penetration index equal to at least +7, and incorporating a filler into said binder prior to cooling it and while it is still liquid.

5. The process of making an asphaltic plastic putty-like composition suitable for use in sealing joints and the like comprising blowing an asphalt to produce an asphalt having a penetration index from +3 to +6, blending the resulting complete blown asphalt in the molten state with a sufficient quantity of a viscous paraffinic oil to produce a binder having a penetration at 25° C. exceeding 50 and a penetration index equal to at least +7 and incorporating a filler into said binder prior to cooling it and while it is still liquid.

JACOB VAN DEN BERGE.